United States Patent
Itoh

(10) Patent No.: US 8,744,179 B2
(45) Date of Patent: Jun. 3, 2014

(54) IMAGE PROCESSING APPARATUS, IMAGE PROCESSING METHOD, AND NON-TRANSITORY COMPUTER READABLE MEDIUM THAT UTILIZES REPRESENTATIVE COLORS

(75) Inventor: Atsushi Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 107 days.

(21) Appl. No.: 13/354,979

(22) Filed: Jan. 20, 2012

(65) Prior Publication Data

US 2013/0058568 A1 Mar. 7, 2013

(30) Foreign Application Priority Data

Sep. 2, 2011 (JP) ................... 2011-191650

(51) Int. Cl.
*G06K 9/00* (2006.01)
(52) U.S. Cl.
USPC ........................................................ 382/165
(58) Field of Classification Search
None
See application file for complete search history.

(56) References Cited

U.S. PATENT DOCUMENTS

| | | | |
|---|---|---|---|
| 2004/0161147 A1 | 8/2004 | Takahashi | |
| 2006/0018533 A1* | 1/2006 | Imamura | 382/164 |
| 2008/0069442 A1 | 3/2008 | Itoh | |
| 2008/0297815 A1 | 12/2008 | Dalrymple et al. | |
| 2009/0041343 A1* | 2/2009 | Itoh | 382/162 |
| 2009/0244664 A1* | 10/2009 | Kanai | 358/530 |
| 2010/0002104 A1* | 1/2010 | On et al. | 348/252 |
| 2010/0260412 A1* | 10/2010 | Yamazaki | 382/164 |
| 2010/0260413 A1* | 10/2010 | Yamazaki | 382/164 |
| 2012/0020552 A1* | 1/2012 | Itoh | 382/163 |

FOREIGN PATENT DOCUMENTS

| | | |
|---|---|---|
| JP | A-2004-246671 | 9/2004 |
| JP | A-2005-328144 | 11/2005 |
| JP | A-2005-328145 | 11/2005 |
| JP | A-2008-065803 | 3/2008 |
| JP | A-2008-301489 | 12/2008 |

* cited by examiner

*Primary Examiner* — Bhavesh Mehta
*Assistant Examiner* — Feng Niu
(74) *Attorney, Agent, or Firm* — Oliff PLC

(57) ABSTRACT

Provided is an image processing apparatus including an extraction unit that extracts representative colors from a target image, a color difference calculation unit that calculates a color difference between the representative color and a pixel of interest of the target image, a change unit that changes a brightness component of the color difference depending on chroma of the representative colors, and a replacement unit that selects the representative color depending on the color difference changed in the change unit to replace a color of the pixel of interest by the representative color.

12 Claims, 14 Drawing Sheets

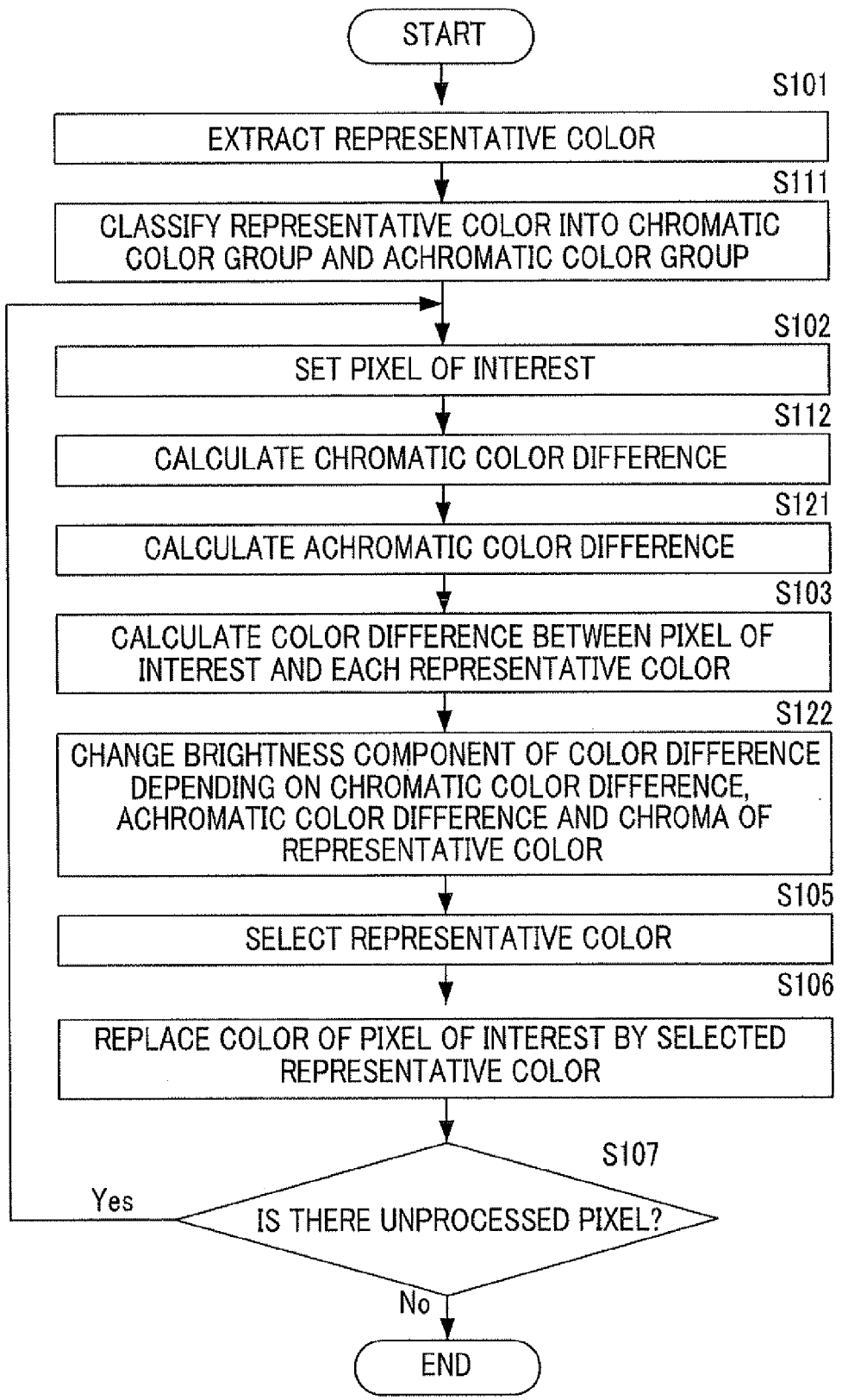

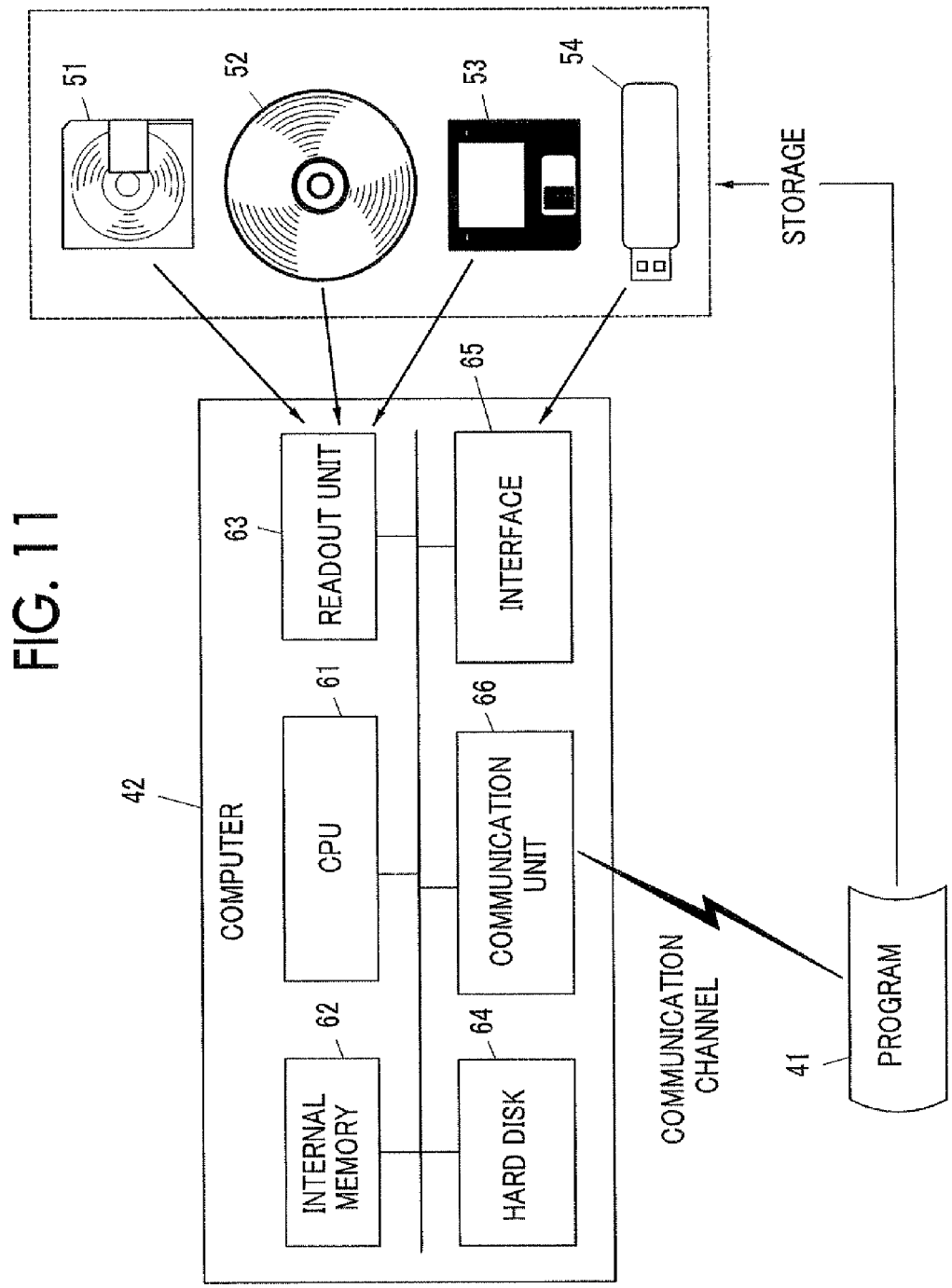

IMAGE PROCESSING APPARATUS, IMAGE PROCESSING METHOD, AND NON-TRANSITORY COMPUTER READABLE MEDIUM THAT UTILIZES REPRESENTATIVE COLORS

CROSS-REFERENCE TO RELATED APPLICATIONS

This application is based on and claims priority under 35 USC 119 from Japanese Patent Application No. 2011-191650 filed Sep. 2, 2011.

BACKGROUND (i) Technical Field

The present invention relates to an image processing apparatus, an image processing method, and a non-transitory computer readable medium.

(ii) Related Art

As image processing, the number of colors used in an image is limited to several representative colors, processing such as the generation of a limited color image is performed by converting color being used into the representative colors.

When the colors of each of the pixels are replaced by the representative colors, a grey color is replaced by a color of which the chroma is higher than grey and may be colored.

SUMMARY

According to an aspect of the invention, there is provided an image processing apparatus including: an extraction unit that extracts representative colors from a target image; a color difference calculation unit that calculates a color difference between the representative color and a pixel of interest of the target image; a change unit that changes a brightness component of the color difference depending on chroma of the representative colors; and a replacement unit that selects the representative color depending on the color difference changed in the change unit to replace a color of the pixel of interest by the representative color.

BRIEF DESCRIPTION OF THE DRAWINGS

Exemplary embodiments of the present invention will be described in detail based on the following figures, wherein:

FIG. 8 is a flow diagram illustrating an example of an operation according to the third exemplary embodiment of the invention.

FIG. 11 is an explanatory diagram illustrating an example of a computer program when functions described in each of the exemplary embodiments of the invention and the modified examples thereof are realized by a computer program, a recording medium having the computer program stored thereon, and a computer.

DETAILED DESCRIPTION

Figure 1:
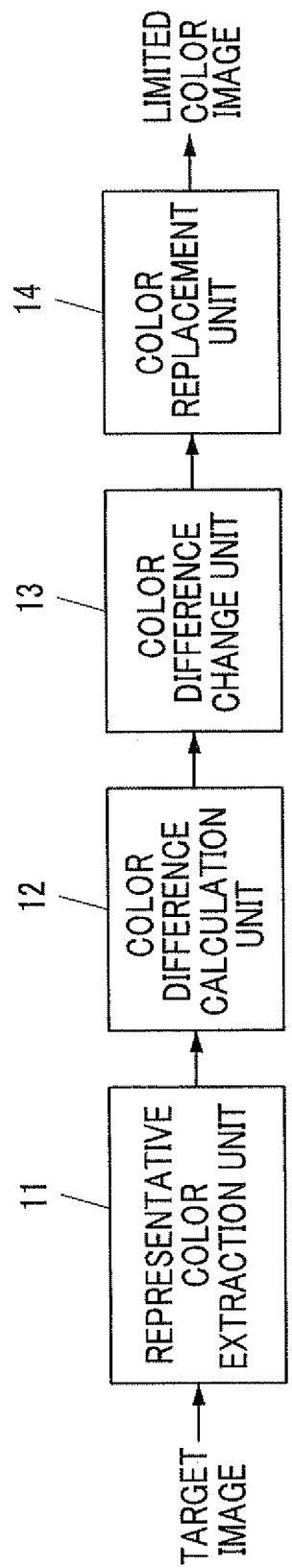
FIG. 1 is a configuration diagram illustrating a first exemplary embodiment of the invention.

FIG. 1 is a configuration diagram illustrating a first exemplary embodiment of the invention. In the drawing, 11 denotes a representative color extraction unit, 12 denotes a color difference calculation unit, 13 denotes a color difference change unit, and 14 denotes a color replacement unit. The representative color extraction unit 11 extracts a representative color from a target image. A method of extracting a representative color, a method hitherto known may be used.

The color difference calculation unit 12 calculates the color difference between a pixel of interest of the target image and each representative color. The color difference may be obtained as the difference between each of the color components in the color space. At that time, the color difference may be obtained in the color space having the brightness component as one color component.

The color difference change unit 13 changes the brightness component of the color difference between the pixel of interest and the representative color which is obtained in the color difference calculation unit 12, depending on the chroma of the representative color. In this change in the brightness component, the brightness component decreases as the chroma of the representative color decreases. In the change in the brightness for the change in the chroma, for example, a function may be set in advance, and a weight with respect to the brightness component may be obtained from the chroma of the representative color by the function to perform weighting with respect to the brightness component of the color difference. The distance in the color space between the representative color and the color of the pixel of interest is changed by changing this brightness component of the color difference.

The color replacement unit 14 selects a representative color in accordance with the color difference changed in the color difference change unit 13, and replaces the color of the pixel of interest by the selected representative color. In the selection of the representative color, the representative color in which the distance between the representative color and the color of the pixel of interest in the color space obtained from the color difference changed in the color difference change unit 13 is shortest may be selected.

Each of the units mentioned above operates using each of the pixels of the target image as the pixel of interest in order, and a limited color image is obtained when the color of the pixel of interest is replaced by the selected representative color.

Figure 2:
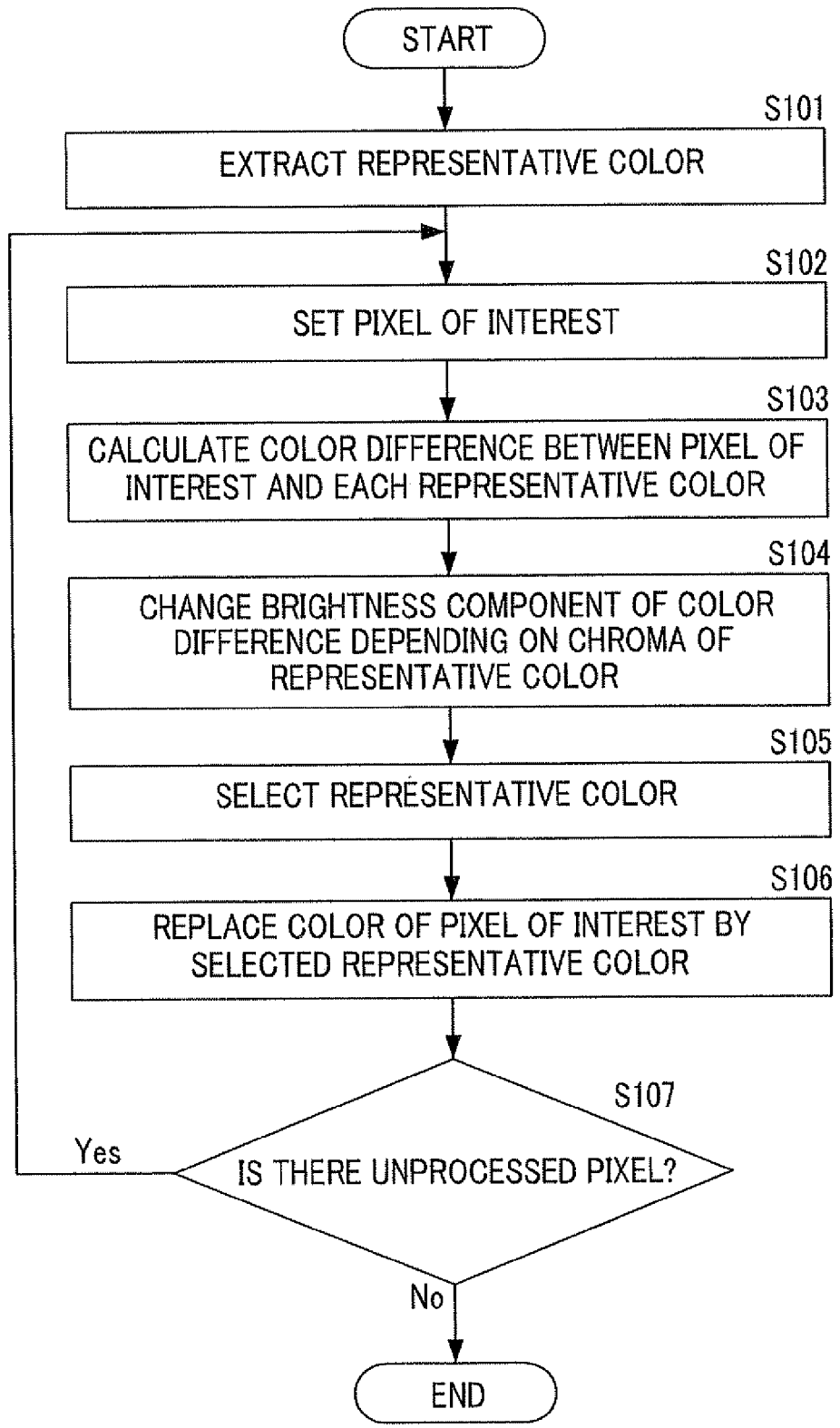
FIG. 2 is a flow diagram illustrating an example of an operation according to the first exemplary embodiment of the invention.

FIG. 2 is a flow diagram illustrating an example of an operation according to the first exemplary embodiment of the invention. In step S101, the representative color extraction unit 11 extracts a representative color from a target image. In step S102, an unprocessed pixel of the target image is then set as a pixel of interest.

In step S103, the color difference calculation unit 12 calculates the color difference between the representative color extracted in the representative color extraction unit 11 and the pixel of interest. In step S104, the color difference change unit 13 changes a brightness component of the color difference calculated in step S103 so that the brightness component decreases as the chroma of the representative color decreases.

In step S105, the color replacement unit 14 selects the representative color in which the distance in the color space obtained from the color difference changed in step S104 is shortest. In step S106, the color of the pixel of interest is replaced by the representative color selected in step S105.

In step S107, it is determined whether an unprocessed pixel remains in pixels of the target image, and a process in which the unprocessed pixel is set as the pixel of interest is repeated returning to step S102 when it remains. When the unprocessed pixel does not remain, the process is terminated.

Figure 3:
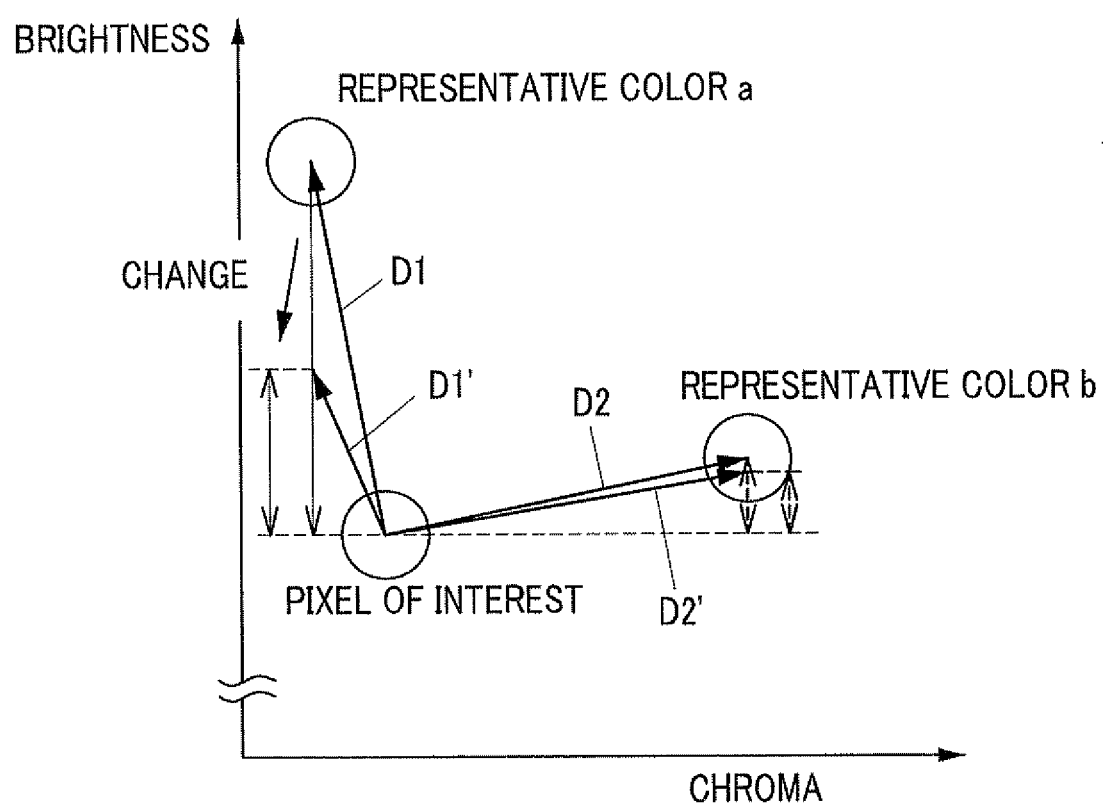
FIG. 3 is an explanatory diagram of a specific example of the operation according to the first exemplary embodiment of the invention.

FIG. 3 is an explanatory diagram illustrating a specific example of the operation according to the first exemplary embodiment of the invention. Representative colors including a representative color a and a representative color b are extracted in step S101 of FIG. 2, and a pixel of interest of the shown color is set in step S102. In FIG. 3, a brightness-chroma plane in a certain hue is shown, and two of the representative color a and the representative color b and the pixel of interest exist in this plane.

The color difference between the representative color a and the pixel of interest and the color difference between the representative color b and the pixel of interest are calculated in step S103. In this example, the distance in the color space obtained from the color difference between the representative color a and the pixel of interest, and the distance in the color space obtained from the color difference between the representative color b and the pixel of interest are equal to each other.

In step S104, the brightness component of the color difference is changed depending on the chroma of the representative color. In this example, the representative color a has a chroma lower than the representative color b. Therefore, the change width of the brightness component of the color difference between the representative color a and the pixel of interest is changed smaller than that of the brightness component of the color difference between the representative color b and the pixel of interest. More specifically, the color difference between the representative color a and the pixel of interest is set to (L1, c1), the color difference between the representative color b and the pixel of interest is set to (L2, c2), and before the change in the brightness component, the distance D1 obtained from the color difference between the representative color a and the pixel of interest and the distance D2 obtained from the color difference between the representative color b and the pixel of interest are set to D1=D2. The distance D1 is equal to $(L1^2+c1^2)^{1/2}$, and the distance D2 is equal to $(L2^2+c2^2)^{1/2}$. A function of obtaining a weight which changes the brightness component corresponding to the chroma is set to W (c), and weights α1 and α2 satisfying the relationships of α1=W (c1), α2=W (c2), and α1<α2 are obtained. When the brightness component is multiplied by this weight, the color difference after the change is equal to (α1·L1, c1) and (α2·L2, c2). When the distance in the color space is obtained from the color difference after the change of the brightness component, the distance D1' is equal to $\{(\alpha1 \cdot L1)^2+c1^2\}^{1/2}$ and the distance D2' is equal to $\{(\alpha2 \cdot L2)^2+c2^2\}^{1/2}$, where the relationship of D1'<D2' is satisfied.

The representative color in which the distance in the color space obtained from the color difference after the change is shortest is selected in step S105, the color of the pixel of interest is replaced by the selected representative color in step S106. For example, in comparison of the representative color a with the representative color b, when the distance D1' in the color space obtained from the color difference between the representative color a and the pixel of interest after the change thereof is compared with the distance D2' in the color space obtained from the color difference between the representative color b and the pixel of interest after the change thereof, the relationship of D1'<D2' is satisfied, whereby the representative color a is selected, and the pixel of interest is replaced by the representative color a.

When the pixel of interest is replaced by the representative color b in this example, the change in the chroma increases compared to the case in which it is replaced by the representative color a, the change in the color after the replacement may feel conspicuous or unnatural. The pixel of interest is replaced by the representative color a, and the change in the chroma is suppressed.

Figure 4:
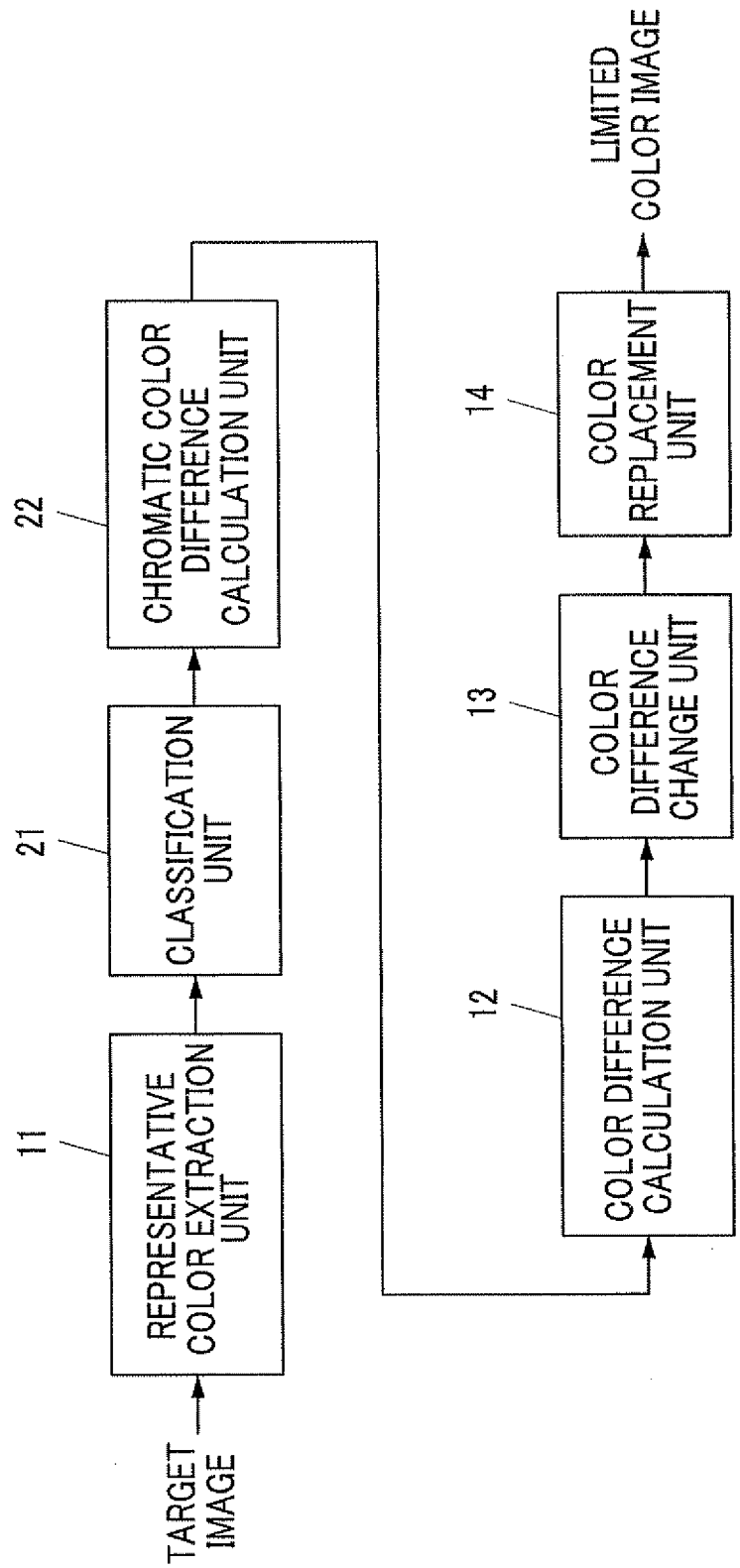
FIG. 4 is a configuration diagram illustrating a second exemplary embodiment of the invention.

FIG. 4 is a configuration diagram illustrating a second exemplary embodiment of the invention. In the drawing, 21 denotes a classification unit, and 22 denotes a chromatic color difference calculation unit. Portions different from those of the first exemplary embodiment mentioned above will be chiefly described. The classification unit 21 classifies the representative colors extracted in the representative color extraction unit 11 into a chromatic color group and an achromatic color group. In this classification, the representative color is determined to be an achromatic color group, for example, when the chroma is set to a predetermined value or less, and it is determined to be a chromatic color group when the chroma is set to a value larger than the preset value. Alternatively, the representative color may be determined to be an achromatic color group when the chrome is set to a value or less set by the brightness, and it may be determined to be a chromatic color group when the chroma is set to a value larger than the above-mentioned value. In this manner, the classification may be performed by other methods.

The chromatic color difference calculation unit 22 calculates the color difference between the pixel of interest and the representative color, having the smallest color difference from that of the pixel of interest, of the representative colors classified into a chromatic color group with respect to the pixel of interest. This color difference is set to a chromatic color difference.

When the chromatic color difference calculated in the chromatic color difference calculation unit 22 is larger than a preset value, the color difference change unit 13 in the second exemplary embodiment changes the brightness component of the color difference between the pixel of interest and each of the representative colors which is obtained in the color difference calculation unit 12, depending on the chroma of each of the representative colors. Alternatively, when the chromatic color difference calculated in the chromatic color difference calculation unit 22 is larger than a preset value and the chroma of the representative color is a preset value or less, the brightness component of the color difference between the representative color and the pixel of interest may be changed depending on the chroma of the representative color. Although the change in the brightness component has been described in the first exemplary embodiment, a change is made in which the brightness component decreases as the chroma of the representative color decreases.

Figure 5:
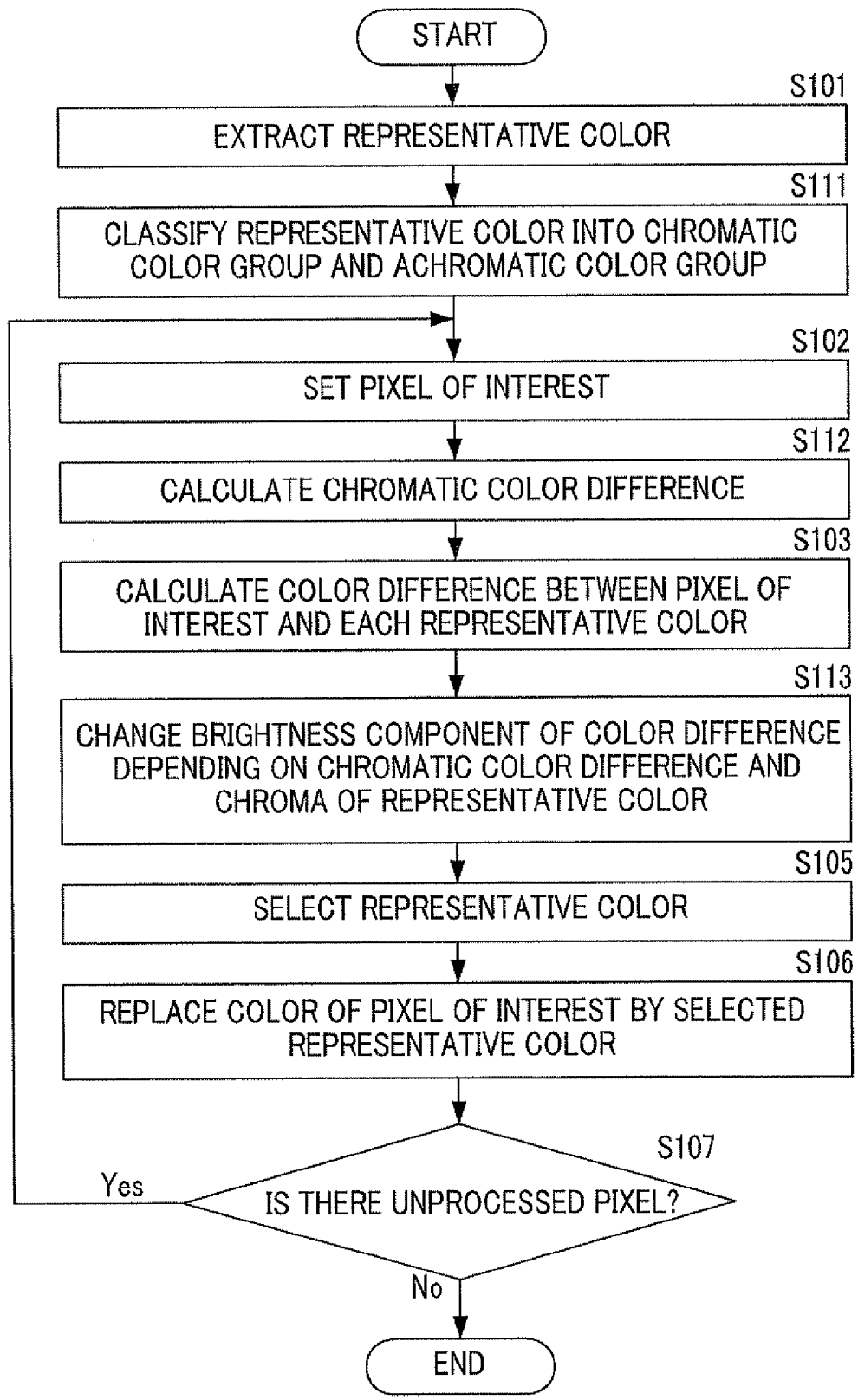
FIG. 5 is a flow diagram illustrating an example of an operation according to the second exemplary embodiment of the invention.

FIG. 5 is a flow diagram illustrating an example of an operation according to the second exemplary embodiment of the invention. Portions different from those of an example of the operation according to the first exemplary embodiment shown in FIG. 2 will be chiefly described. After the representative color extraction unit 11 extracts the representative color from the target image in step S101, the classification unit 21 classifies the representative colors extracted in step S101 into a chromatic color group and an achromatic color group in step S111.

An unprocessed pixel of the target image is set to the pixel of interest in step S102, and processes up to step S106 are performed on the set pixel of interest.

In step S112, the chromatic color difference calculation unit 22 calculates the color difference between the pixel of interest and the representative color, having the smallest color difference from that of the pixel of interest which is set in step S102 (having the shortest distance in the color space), of the representative colors classified into a chromatic color group in step S111, to set this color difference to a chromatic color difference. In addition, in step S103, the color difference calculation unit 12 calculates the color difference between each of the representative colors and the pixel of interest. Any one of the processes of steps S112 and S103 may be first performed, and may be concurrently performed.

In an example of the operation according to the second exemplary embodiment, a process of step S113 is performed as the process corresponding to step S104 of FIG. 2. In step S113, when the chromatic color difference calculated in the chromatic color difference calculation unit 22 is larger than a preset value, the color difference change unit 13 decreases the brightness component of the color difference between the pixel of interest and each of the representative colors which is obtained in the color difference calculation unit 12 as the chroma of each of the representative colors decreases. Alternatively, when the chromatic color difference calculated in the chromatic color difference calculation unit 22 is larger than a preset value and the chroma of the representative color is a preset value or less, a change is made in which the brightness component of the color difference between the representative color and the pixel of interest decreases as the chroma of the representative color decreases.

In step S105, the color replacement unit 14 selects the representative color in which the distance in the color space obtained from the color difference changed in step S113 is shortest, and in step S106, replaces the color of the pixel of interest by the representative color selected in step S105.

It is determined whether an unprocessed pixel remains in step S107, and the process in which the unprocessed pixel is set to the pixel of interest is repeated returning to step S102 when it remains. When the unprocessed pixel does not remain, the process is terminated.

Figure 6A:
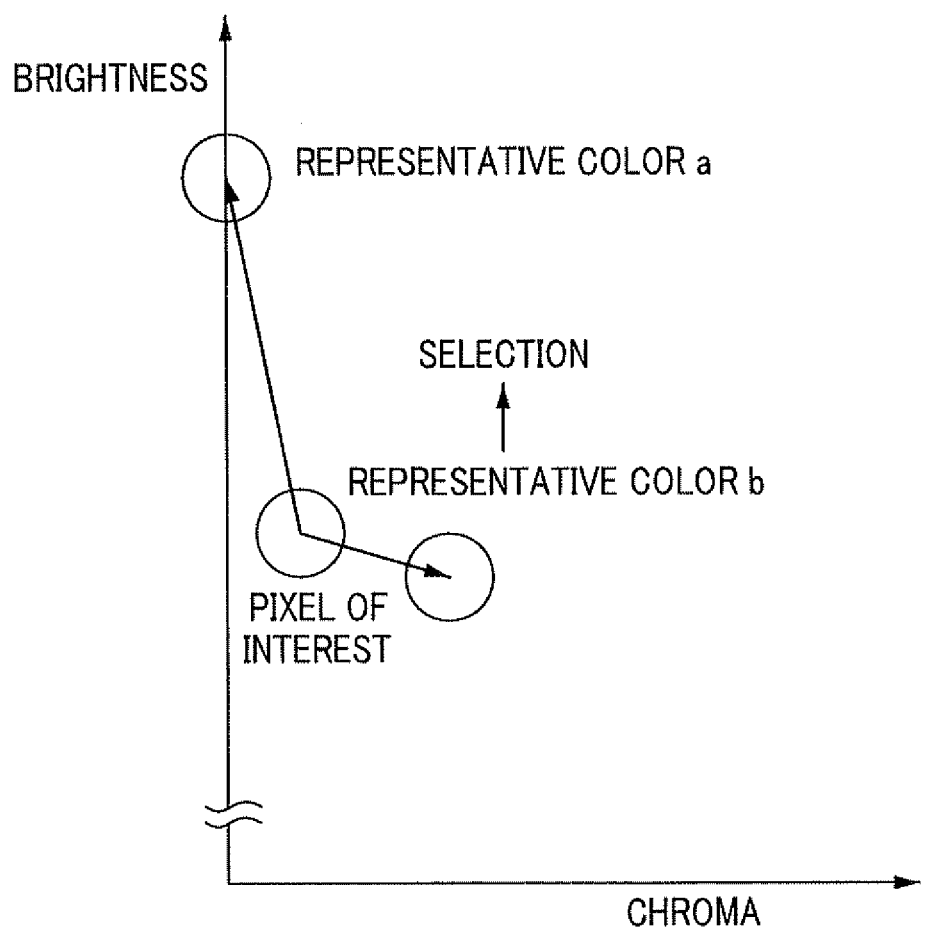
FIGS. 6A and 6B are explanatory diagrams illustrating a specific example of the operation according to the second exemplary embodiment of the invention.
Figure 6B:
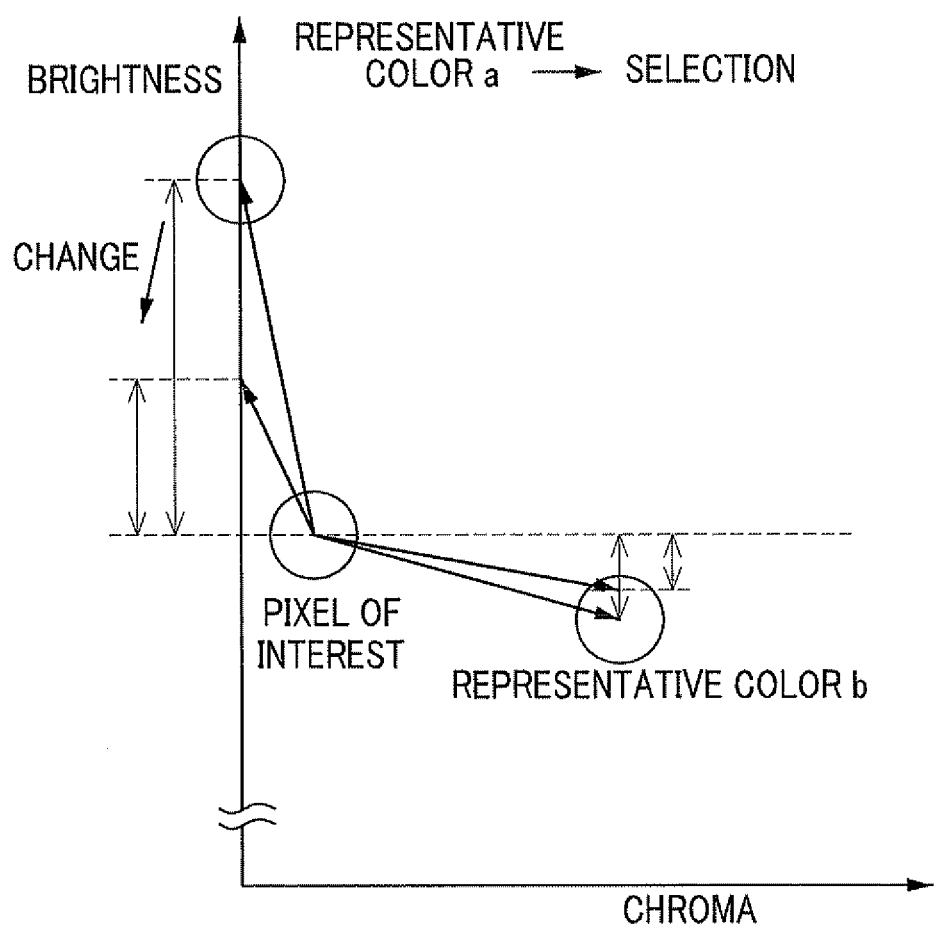

FIGS. 6A and 6B are explanatory diagrams illustrating a specific example of the operation according to the second exemplary embodiment of the invention. The representative colors including the representative color a and the representative color b are extracted in step S101, and in step S111, the representative color a is classified into an achromatic color group, and the representative color b is classified into a chromatic color group. In addition, the pixel of interest of the shown color is set in step S102, and the representative color, having the smallest color difference from that of the pixel of interest (having the shortest distance in the color space), of the representative colors of the chromatic color group is set to the representative color b. In the example shown in FIG. 6B, a case is shown in which the chroma of the representative color b is larger than that of the example shown in FIG. 6A. Meanwhile, in FIGS. 6A and 6B, a brightness-chroma plane in a certain hue is shown, and two of the representative color a and the representative color b and the pixel of interest exist in this plane.

In step S112, the chromatic color difference calculation unit 22 calculates the color difference between the pixel of interest and the representative color, having the smallest color difference from that of the pixel of interest, of the representative colors of the chromatic color group, to set this color difference to a chromatic color difference. In this example, the color difference between the pixel of interest and the representative color b is set to the chromatic color difference. In addition, in step S103, the color difference calculation unit 12 calculate the color difference between the pixel of interest and each of the representative colors including the representative color a and the representative color b.

In step S113, when the chromatic color difference calculated in step S112 is larger than a preset value, the color difference change unit 13 decreases the brightness component of the color difference between the pixel of interest and each of the representative colors as the chroma of each of the representative colors decreases. In the example shown in FIG. 6A, the chroma of the representative color b is set to a preset value or less, and for this example, a change in the brightness component is not performed. In the example shown in FIG. 6B, the chroma of the representative color b is set to be larger than a preset value, and in this case, a change in the brightness component is performed. Thereby, for example, since the chroma of the representative color a is smaller than that of the representative color b, a change is made in which the brightness component of the representative color a decreases. Since the chroma of the representative color b is larger than that of the representative color a, the rate of the change in the brightness component is smaller than that of the representative color a. The specific example of the change in the brightness component is described in step S104 of FIG. 3, and thus the description thereof will be omitted herein.

Meanwhile, the change in the brightness component may be performed only when the chromatic color difference is larger than a preset value and the chroma of the representative color is a preset value or less. In this case, the representative color in which the brightness component is changed decreases compared to the case in which the chroma of the representative color is not limited, and the processing amount is reduced.

The representative color in which the distance in the color space obtained from the color difference after the change is shortest is selected in step S105, and the color of the pixel of interest is replaced by the selected representative color in step S106. For example, in the example shown in FIG. 6A, since the distance from the pixel of interest to the representative color b is shorter than the distance therefrom to the representative color a, the representative color b is selected, and the color of the pixel of interest is replaced by the representative color b. In this case, the chroma of the representative color b is lower than that of the example shown in FIG. 6B, and it is preferable that the color of the pixel of interest is replaced by the representative color b.

In addition, for example, in the example shown in FIG. 6B, the distance in the color space, obtained from the color difference, from the pixel of interest after changing the brightness component of the color difference to the representative color a is shorter than the distance therefrom to the representative color b. This is because the change in the brightness component of the color difference of the representative color a is larger than that of the representative color b. Therefore, the representative color a is selected and the color of the pixel of interest is replaced by the representative color a. For this example, the chroma of the representative color b is higher than that of the example shown in FIG. 6A, and when the color of the pixel of interest is replaced by the representative color b, a change in the chrome before and after the replacement becomes conspicuous. The color of the pixel of interest is replaced by the representative color a, whereby a feeling of strangeness due to the change in the chroma of the pixel of interest is suppressed further than the case in which the color thereof is replaced by the representative color b.

When the color of the pixel of interest is replaced by the representative color, one factor that gives a feeling of strangeness to an observer is a difference in the chroma before and after the replacement. In the second exemplary embodiment, when the color difference in the case where the color of the pixel of interest is replaced by the representative color of a chromatic group is larger than a preset value, the replacement of the color thereof by the representative color of the chromatic group may give a feeling of strangeness to an observer, a change is performed on the brightness component of the color difference from each of the representative colors and then the representative color is selected. Meanwhile, even when the color difference in the case where the color thereof is replaced by the representative color of the chromatic group is a preset value or less and, for example, the representative color located at the shortest distance in the color space is selected as it is and the replacement thereof is performed, a feeling of strangeness given to an observer is smaller than the case where the color difference is larger than a preset value, and the change in the brightness component is not performed.

Figure 7:
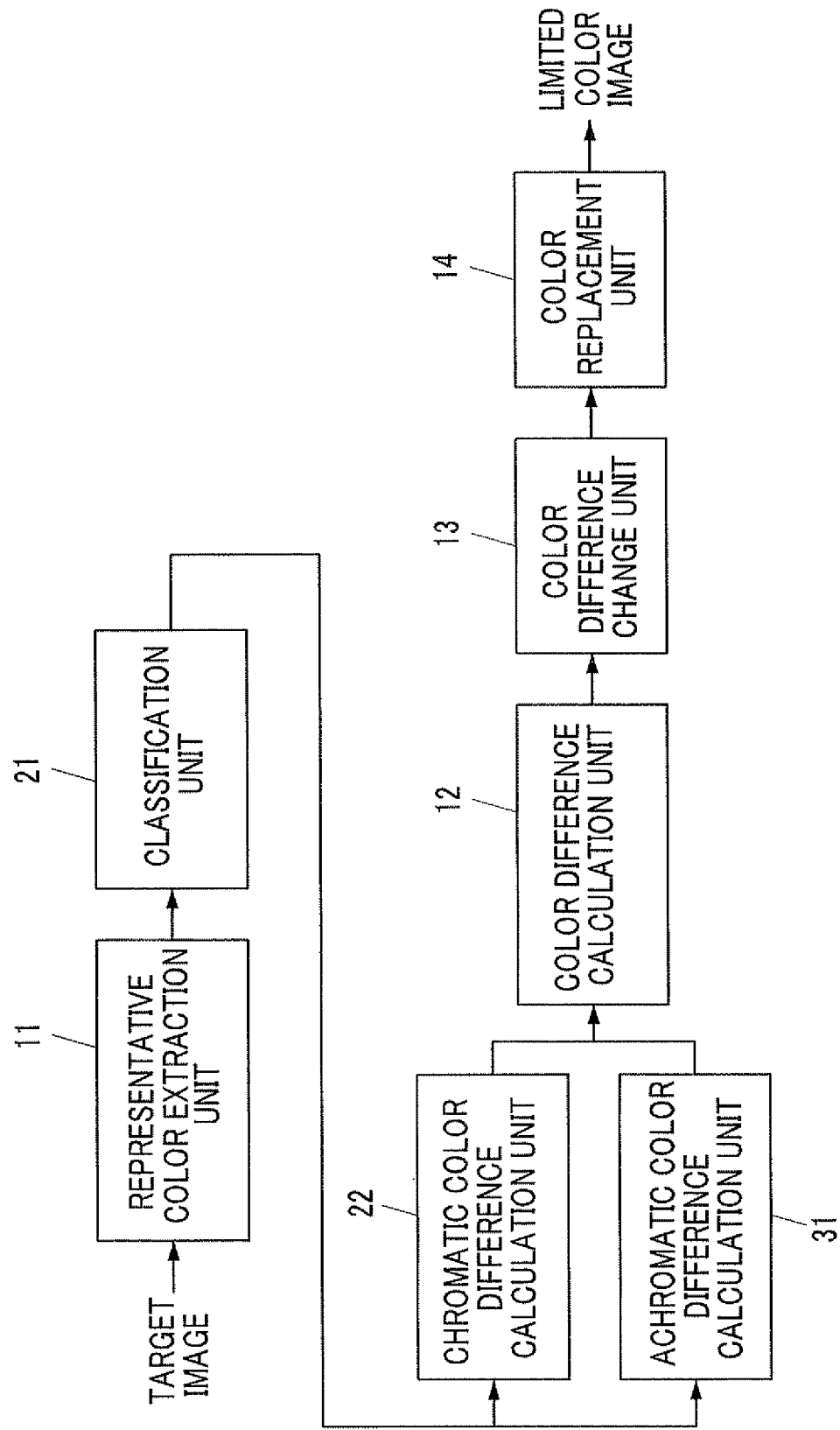
FIG. 7 is a configuration diagram illustrating a third exemplary embodiment of the invention.

FIG. 7 is a configuration diagram illustrating a third exemplary embodiment of the invention. In the drawing, 31 denotes an achromatic color difference calculation unit. Portions different from the first and second exemplary embodiments mentioned above will be chiefly described. The achromatic color difference calculation unit 31 calculates the color difference between the pixel of interest and the representative color, having the smallest color difference from that of the pixel of interest, of the representative colors classified into an achromatic color group in the classification unit 21 with respect to the pixel of interest. This color difference is set to an achromatic color difference.

When the distance difference between the chromatic color difference calculated in the chromatic color difference calculation unit 22 and the achromatic color difference calculated in the achromatic color difference calculation unit 31 is a preset value or less and the difference of the brightness component between the chromatic color difference and the achromatic color difference is a preset value or less, the color difference change unit 13 in the third exemplary embodiment changes the brightness component of the color difference between the pixel of interest and each of the representative colors which is obtained in the color difference calculation unit 12, depending on the chroma of each of the representative colors. Alternatively, when the distance difference between the chromatic color difference and the achromatic color difference is a preset value or less, the difference of the brightness component between the chromatic color difference and the achromatic color difference is a preset value or less, and the chroma of the representative color is a preset value or less, the brightness component of the color difference between the representative color and the pixel of interest may be changed depending on the chroma of the representative color. The distance difference is obtained as vectors using the pixel of interest as an end point, together with the chromatic color difference and the achromatic color difference, and thus may be set to a length in the color space of a difference vector between two vectors. In addition, although the change in the brightness component has been described in the first exemplary embodiment, a change is made in which the brightness component decreases as the chroma of the representative color decreases.

FIG. 8 is a flow diagram illustrating an example of an operation according to the third exemplary embodiment of the invention. Portions different from an example of the operation according to the first exemplary embodiment shown in FIG. 2 and an example of the operation according to the second exemplary embodiment shown in FIG. 5 will be chiefly described. After the representative color extraction unit 11 extracts the representative color from the target image in step S101, the classification unit 21 classifies the representative color into a chromatic color group and an achromatic color group in step S111.

An unprocessed pixel of the target image is set to the pixel of interest in step S102, and processes up to step S106 are performed on the set pixel of interest.

The chromatic color difference calculation unit 22 calculates the chromatic color difference in step S112. In addition, in step S121, the achromatic color difference calculation unit 31 calculates, as the achromatic color difference, the color difference between the pixel of interest and the representative color, having the smallest color difference from that of the pixel of interest, of the representative colors classified into an achromatic color group in the classification unit 21 with respect to the pixel of interest. Further, in step S103, the color difference calculation unit 12 calculates the color difference between each of the representative colors and the pixel of interest. Any of the processes of steps S112, S121, and S103 may be first performed, and may be concurrently performed.

In an example of the operation according to the third exemplary embodiment, a process of step S122 is performed as the processes corresponding to step S104 of FIG. 2 and step S113 of FIG. 5. In step S122, the color difference change unit 13 calculates the distance difference between the chromatic color difference calculated in the chromatic color difference calculation unit 22 and the achromatic color difference calculated in the achromatic color difference calculation unit 31. When the distance difference is a preset value or less and the difference of the brightness component between the chromatic color difference and the achromatic color difference is a preset value or less, the color difference change unit decreases the brightness component of the color difference between the pixel of interest and each of the representative colors which is obtained in the color difference calculation unit 12 as the chroma of each of the representative colors decreases. Alternatively, when the distance difference between the chromatic color difference and the achromatic color difference is a preset value or less, the difference of the brightness component between the chromatic color difference and the achromatic color difference is a preset value or less, and the chrome of the representative color is a preset value or less, a change is made in which the brightness component of the color difference between the representative color and the pixel of interest decreases as the chroma of the representative color decreases.

In step S105, the color replacement unit 14 selects the representative color in which the distance in the color space obtained from the color difference changed in step S122 is shortest, and in step S106, replaces the color of the pixel of interest by the representative color selected in step S105.

It is determined whether an unprocessed pixel remains in step S107, and the process in which the unprocessed pixel is set to the pixel of interest is repeated returning to step S102 when it remains. When the unprocessed pixel does not remain, the process is terminated.

Figure 9A:
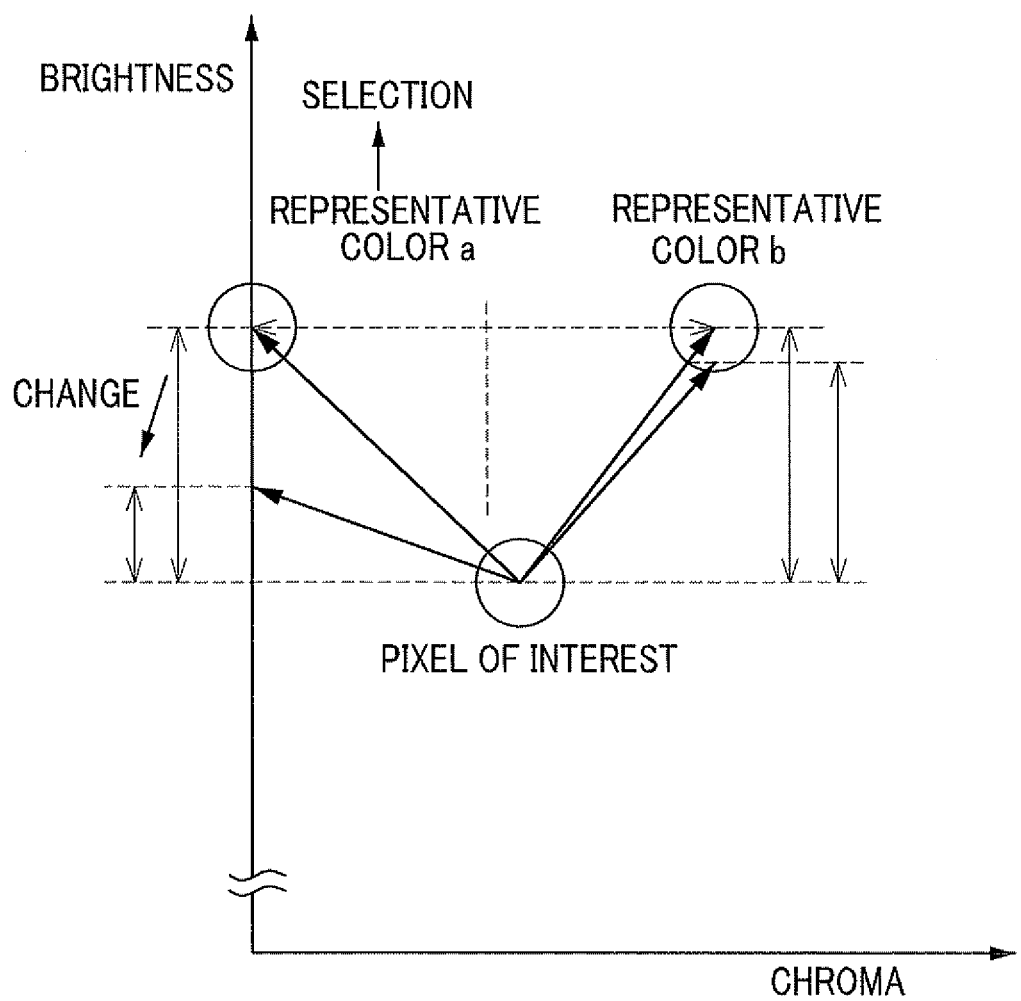
FIGS. 9A and 9B are explanatory diagrams illustrating a specific example of the operation according to the third exemplary embodiment of the invention.
Figure 9B:
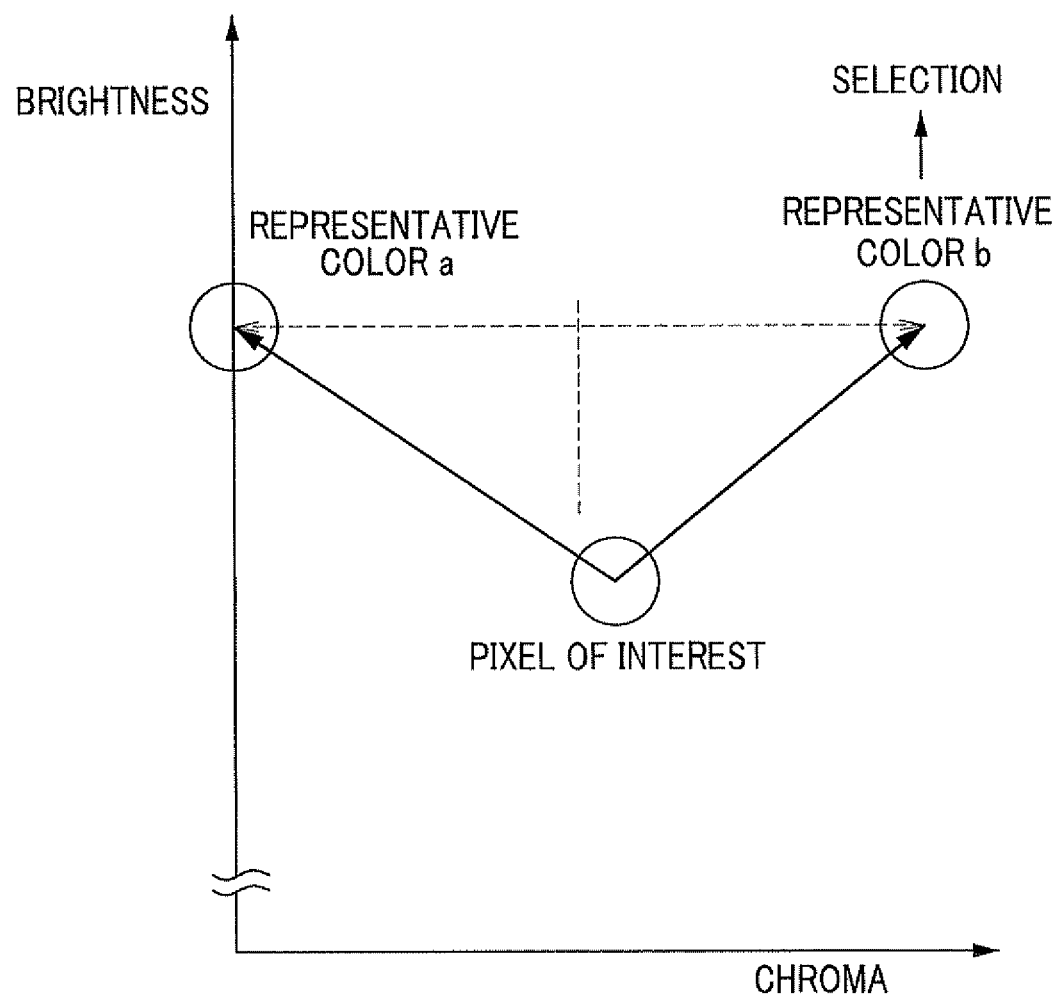

FIGS. 9A and 9B are explanatory diagrams illustrating a specific example of the operation according to the third exemplary embodiment of the invention. The representative colors including the representative color a and the representative color b are extracted in step S101, and in step S111, the representative color a is classified into an achromatic color group, and the representative color b is classified into a chromatic color group. In addition, the pixel of interest of the shown color is set in step S102, and the representative color, having the smallest color difference from that of the pixel of interest (having the shortest distance in the color space), of the representative colors of the chromatic color group is set to the representative color b, and the representative color, having the smallest color difference from that of the pixel of interest (having the shortest distance in the color space), of the representative colors of the achromatic color group is set to the representative color a. In the example shown in FIG. 9B, a case is shown in which the chroma of the representative color b is larger than that of the example shown in FIG. 9A. Meanwhile, in FIGS. 9A and 9B, a brightness-chroma plane in a certain hue is shown, and two of the representative color a and the representative color b and the pixel of interest exist in this plane.

In step S112, the chromatic color difference calculation unit 22 calculates the color difference between the pixel of interest and the representative color, having the smallest color difference from that of the pixel of interest, of the representative colors of the chromatic color group, to set this color difference to a chromatic color difference. In this example, the color difference between the pixel of interest and the representative color b is set to the chromatic color difference. In addition, in step S121, the achromatic color difference calculation unit 31 calculates the color difference between the pixel of interest and the representative color, having the smallest color difference from that of the pixel of interest, of the representative colors of the achromatic color group, to set this color difference to an achromatic color difference. In this example, the color difference between the pixel of interest and the representative color a is set to the achromatic color difference. Further, in step S103, the color difference calculation unit 12 calculates the color difference between the pixel of interest and each of the representative colors including the representative color a and the representative color b.

In step S122, the color difference change unit 13 first obtains the distance difference between the chromatic color difference calculated in step S112 and the achromatic color difference calculated in step S121. The distance difference may be obtained as a length of the difference vector between a vector of the chromatic color difference and a vector of the achromatic color difference. In this example, the distance difference becomes a distance in the color space between the representative color a and the representative color b. When this distance difference is a preset value or less and the difference of the brightness component between the chromatic color difference and the achromatic color difference is a preset value or less, a change is made in which the brightness component of the color difference between the pixel of interest and each of the representative colors which is obtained in step S103 decreases as the chroma of each of the representative colors decreases.

In two examples shown in FIGS. 9A and 9B, cases are shown in which the difference of the brightness component between the chromatic color difference and the achromatic color difference is a preset value or less. In the example shown in FIG. 9A, a case is further shown in which the distance difference between the chromatic color difference and the achromatic color difference, that is, the distance in the color space between the representative color a and the representative color b is a preset value or less. In this case, a change in the brightness component is performed. Although the difference of the brightness component between the representative color a and the representative color b is a preset value or less before the change, the brightness component of the color difference between the color of the pixel of interest and the representative color a is changed smaller than the brightness component of the color difference between the representative color b and the color of the pixel of interest. The specific example of the change in the brightness component is described in step S104 of FIG. 3, and thus the description thereof will be omitted herein. Meanwhile, in the example shown in FIG. 9B, a case is shown in which the distance difference between the chromatic color difference and the achromatic color difference is larger than a preset value, and for this example, the change in the brightness component of the color difference is not performed. In addition, even when the difference of the brightness component between the chromatic color difference and the achromatic color difference is larger than a preset value, although not illustrated, the change in the brightness component of the color difference is not performed.

Conditions for performing the change in the brightness component of the color difference may be performed only when the distance difference between the chromatic color difference and the achromatic color difference is a preset value or less, the difference of the brightness component between the chromatic color difference and the achromatic color difference is a preset value or less, and the chroma of the representative color is a preset value or less. In this case, the representative color in which the brightness component is changed decreases compared to the case in which the chroma of the representative color is not limited, and the processing amount is reduced.

The representative color in which the distance in the color space obtained from the color difference after the change is shortest is selected in step S105, and the color of the pixel of interest is replaced by the selected representative color in step S106. For example, in the example shown in FIG. 9A, the brightness component of the color difference is changed, and the distance in the color space, obtained from the color difference, from the pixel of interest after the change to the representative color a is shorter than the distance therefrom to the representative color b. This is because the change in the brightness component of the color difference of the representative color a is larger than that of the representative color b. Therefore, the representative color a is selected and the color of the pixel of interest is replaced by the representative color a. For this example shown in FIG. 9A, it is assumed that the pixel of interest is colored due to inclusion of noise components in the achromatic color. In such a case, when the color of the pixel of interest is replaced by the representative color of the chromatic color group, a feeling of strangeness may occur due to the change in the chroma of the pixel of interest which is originally achromatic. A feeling of strangeness does not occur due to the change in the chroma of the pixel of interest by replacing the color thereof by the representative color a classified into the achromatic color group.

In addition, for example, in the example shown in FIG. 9B, the change in the brightness component of the color difference is not performed, and the representative color is selected depending on the distance from the pixel of interest and the replacement is performed. For example, when the representative color b is selected, the color of the pixel of interest is replaced by the representative color b. In this case, even when the pixel of interest is colored due to inclusion of noise components in the achromatic color, the color of the pixel of interest is not accidentally replaced by the representative color of the chromatic color group.

Meanwhile, the conditions in which the color difference change unit 13 changes the brightness component of the color difference in the above-mentioned third exemplary embodiment and the conditions in which the color difference change unit 13 changes the brightness component of the color difference in the second exemplary embodiment may be used in combination with each other. For example, when the difference of the brightness component between the chromatic color difference and the achromatic color difference is a preset value or less, it is determined whether the change in the brightness component of the color difference is performed depending on the distance difference between the chromatic color difference and the achromatic color difference described in the third exemplary embodiment, and further, the change process is performed by limiting the chroma of the representative color. In addition, when the difference of the brightness component between the chromatic color difference and the achromatic color difference is larger than a preset value, it is determined whether the change in the brightness component of the color difference is performed depending on whether the chromatic color difference is larger than a preset value, and further, the change process may be performed by limiting the chroma of the representative color. Alternatively, it may be determined, by weighting, whether any of the conditions are valued depending on the difference of the brightness component between the chromatic color difference and the achromatic color difference.

As modified examples in the mentioned-above first, second, and third exemplary embodiments, when the color difference change unit 13 changes the brightness component of the color difference between the color of the pixel of interest and each of the representative colors, the color difference change unit may not only change the brightness component depending on the chrome of the representative color, but also may change it depending on the chrome of the pixel of interest. In the change depending on the chroma of the pixel of interest, the brightness component of the color difference between the pixel of interest and the representative color is made smaller as the chroma of the color of the pixel of interest is lower, and the brightness component of the color difference between the pixel of interest and the representative color is not preferably changed as the chrome of the color of the pixel of interest is higher. Meanwhile, the relationship between the chrome of the color of the pixel of interest and the decreasing amount of the brightness component of the color difference is preferably set in advance. For example, when the distance between the representative color and the pixel of interest used at the time of selecting the representative color is obtained, a weight multiplied by the brightness component is preferably given in advance as such a function that the weight becomes smaller as the chrome of the color of the pixel of interest is lower, and the weight becomes larger as the chrome is higher. The brightness component becomes smaller as the weight is smaller. More specifically, as a function that obtains a weight for changing the brightness component in response to to the chrome described in step S104 of FIG. 2 in the first exemplary embodiment, a function W (c, c') coming closer to 0 as chroma c' of the representative color is lower is used using chroma c' of the pixel of interest together with chroma c of the representative color, and the change in the brightness component is preferably performed by multiplying weight $\alpha=W(c, c')$ by the brightness component of the color difference between the color of the pixel of interest and the representative color.

Figure 10A:
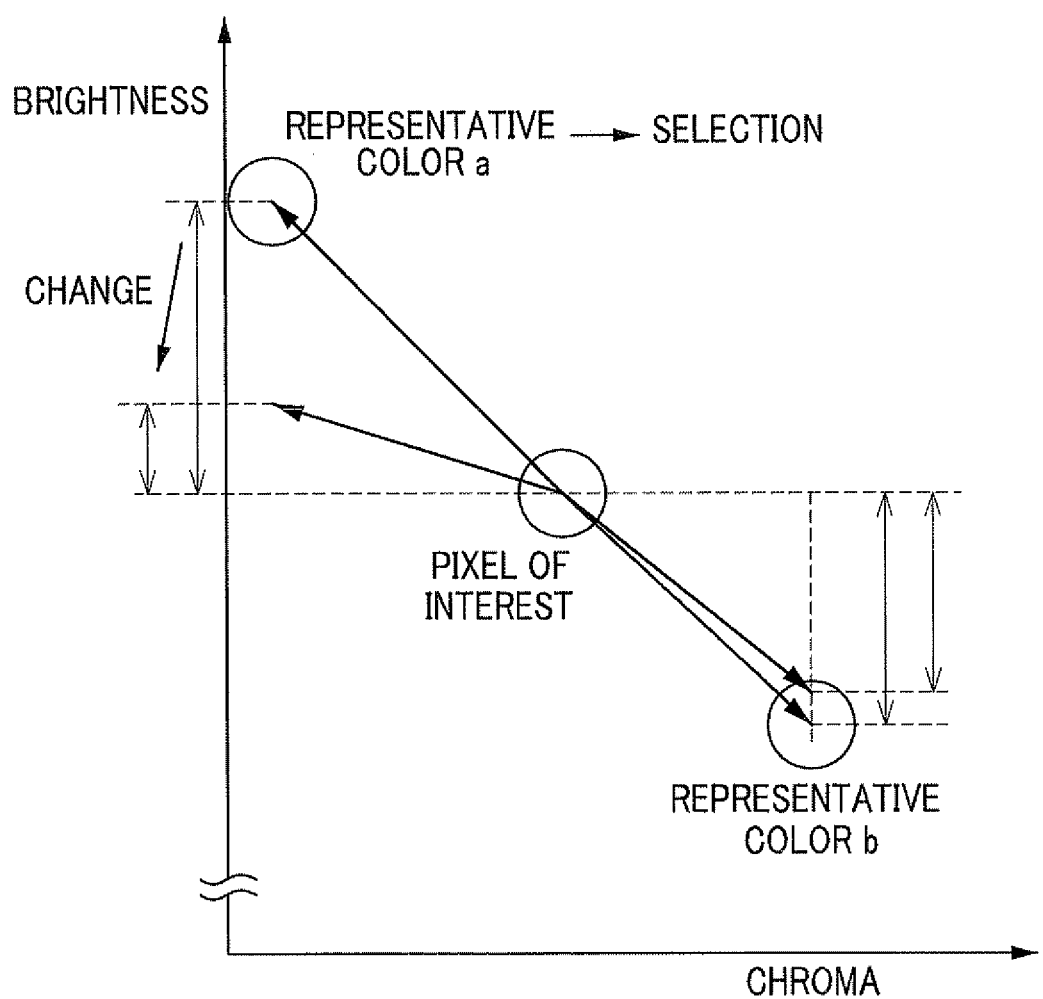
FIGS. 10A and 10B are explanatory diagrams illustrating a specific example when chroma of a color of a pixel of interest is used in a change in a brightness component of the color difference between a pixel of interest and a representative color.
Figure 10B:
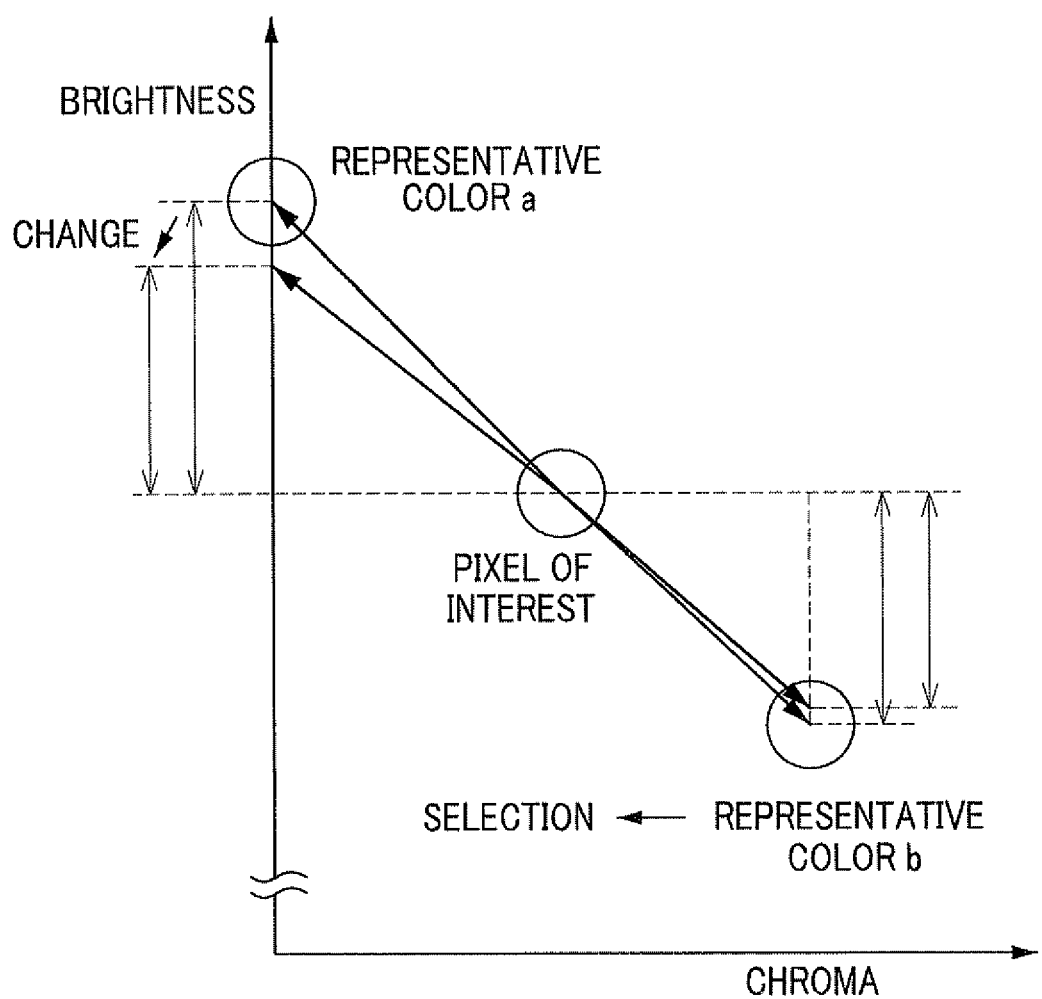

FIGS. 10A and 10B are explanatory diagrams illustrating a specific example when the chroma of the color of the pixel of interest is used in a change in the brightness component of the color difference between the pixel of interest and the representative color. The representative colors including the representative color a and the representative color b are extracted, and the representative color a is classified into an achromatic color group, and the representative color b is classified into a chromatic color group. In addition, the pixel of interest of the shown color is set, the representative color, having the smallest color difference from that of the pixel of interest (having the shortest distance in the color space), of the representative colors of the chromatic color group is the representative color b, and the color difference between the pixel of interest and the representative color b is larger than a preset value.

In the example shown in FIG. 10A, a case is shown in which the color difference change unit 13 changes the brightness component of the color difference between the pixel of interest and each of the representative colors, depending on an example of the operation described in the above-mentioned second exemplary embodiment. In this case, the representative color a is selected and the color of the pixel of interest is replaced by the representative color a.

In the example shown in FIG. 10B, a case is shown in which the chroma of the color of the pixel of interest is also used, when the color difference change unit 13 changes the brightness component of the color difference between the pixel of interest and each of the representative colors. The change in the brightness component is suppressed further than that in the example shown in FIG. 10A depending on the value of the chroma of the pixel of interest. In this case, the representative color b is selected and the color of the pixel of interest is replaced by the representative color b.

As the chroma of the color of the pixel of interest is lower, a feeling of strangeness is given to an observer due to the change in the chroma. Therefore, a control is performed so that the color of the pixel of interest is replaced by the representative color having a lower chroma as the chroma thereof is lower, and the color replacement by the representative color is performed so as not to give a feeling of strangeness to an observer.

FIG. 11 is an explanatory diagram illustrating an example of a computer program when functions described in each of the exemplary embodiments of the invention and the modified examples thereof are realized by a computer program, a recording medium having the computer program stored thereon, and a computer. In the drawing, 41 denotes a program, 42 denotes a computer, 51 denotes a magneto-optical disc, 52 denotes an optical disc, 53 denotes a magnetic disk, 54 denotes a memory, 61 denotes a CPU, 62 denotes an internal memory, 63 denotes a readout unit, 64 denotes a hard disk, 65 denotes an interface, and 66 denotes a communication unit.

The function of each of the units described in each of the exemplary embodiments of the invention and the modified examples thereof mentioned above may be entirely or partially realized by the program 41 for causing a computer to execute the function. In that case, the program 41, data used by the program and the like may be stored in a recording medium read out by a computer. The recording medium is a medium that causes change states of magnetic, optical, and electrical energy or the like in response to the content description of a program with respect to the readout unit 63 included in hardware resources of a computer, and transfers the content description of a program to the readout unit 63 in the form of signals corresponding thereto. For example, the recording medium includes the magneto-optical disk 51, the optical disk 52 (including a CD, a DVD and the like), the magnetic disk 53, the memory 54 (including an IC card, a memory card, a flash memory and the like) and the like. Of course, the recording medium is not limited to a portable type.

When the program 41 is stored in such a recording medium, the program 41 is read out from a computer, for example, by mounting the recording medium in the readout unit 63 or the interface 65 of the computer 42 and is stored in the internal memory 62 or the hard disk 64 (including a magnetic disk or a silicon disk and the like), and the function described in each of the exemplary embodiments of the invention and the modified examples thereof mentioned above is all or partially realized by executing the program 41 using the CPU 61. Alternatively, the program 41 is transferred to the computer 42 through a communication channel, the program 41 is received in the communication unit 66 of the computer 42 and is stored in the internal memory 62 or the hard disk 64, and the above-mentioned function may be realized by executing the program 41 using the CPU 61.

The computer 42 may be connected to various devices through the interface 65. For example, the computer may also be connected to a display unit that displays information or an acceptance unit that accepts information from a user, and the like. In addition, for example, an image reading apparatus may be connected through the interface 65, and the processes described in each of the exemplary embodiments of the invention and the modified examples thereof may be performed using an image read out by the image reading apparatus or an image obtained by performing a process on the image as an image to be processed. A limited color image after the process may be sent to another program, stored in the hard disk 64, stored in a recording medium through the interface 65, or transferred to the outside through the communication unit 66. The limited color image may be compressed at the time of the storage or the transfer. The amount of data smaller than the case where the image is not formed as the limited color image is preferably stored or transferred. Further, the image forming apparatus may be connected to the interface 65, and the limited color image after the process may be formed by the image forming apparatus.

Of course, the configuration may be partially configured by hardware, and may be entirely configured by hardware. Alternatively, the configuration may be configured as a program including all or a portion of the functions described in each of the exemplary embodiments of the invention and the modified examples thereof along with another configuration. Of course, when the configuration is applied to another application, it may be integrated with a program in the application.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a memory that stores instructions;
    a processor configured to execute the instructions to act as:
        an extraction unit that extracts representative colors from a target image;
        a color difference calculation unit that calculates a color difference between each of the representative colors and a pixel of interest of the target image;
        a change unit that changes a brightness component of the color difference depending on chroma of the representative colors; and
        a replacement unit that selects one of the representative colors depending on the color difference changed in the change unit to replace a color of the pixel of interest by the selected one of the representative colors.

2. The image processing apparatus according to claim 1, further comprising:
    a classification unit that classifies the representative colors extracted in the extraction unit into a chromatic color group and an achromatic color group; and
    a chromatic color difference calculation unit that calculates a plurality of chromatic color differences, which are the color differences between the pixel of interest and the representative colors, and calculates one of the chromatic color differences having the smallest color difference from that of the pixel of interest, of the representative colors classified into the chromatic color group with respect to the pixel of interest,
    wherein when the one of the chromatic color differences is larger than a preset value, the change unit changes the brightness component of the color difference.

3. The image processing apparatus according to claim 2, wherein the change unit further changes the brightness component of the color difference depending on chroma of the pixel of interest.

4. The image processing apparatus according to claim 2, wherein when the one of the chromatic color differences is larger than a preset value and the chroma of the selected one of the representative colors is a preset value or less, the change unit changes the brightness component of the color difference.

5. The image processing apparatus according to claim 4, wherein the change unit further changes the brightness component of the color difference depending on chroma of the pixel of interest.

6. The image processing apparatus according to claim 1, further comprising:
    a classification unit that classifies the representative colors extracted in the extraction unit into a chromatic color group and an achromatic color group;
    a chromatic color difference calculation unit that calculates a plurality of chromatic color differences which are the color differences between the pixel of interest and the representative colors, and calculates one of the chromatic color differences having the smallest color difference from that of the pixel of interest, of the representative colors classified into the chromatic color group with respect to the pixel of interest; and
    an achromatic color difference calculation unit that calculates a plurality of achromatic color differences, which are the color differences between the pixel of interest and the representative colors, and calculates one of the achromatic color differences having the smallest color difference from that of the pixel of interest, of the representative colors classified into the achromatic color group with respect to the pixel of interest,
    wherein when a distance difference between the one of the chromatic color differences and the one of the achromatic color differences is a preset value or less and the difference of the brightness component between the chromatic color difference and the achromatic color difference is a preset value or less, the change unit changes the brightness component of the color difference.

7. The image processing apparatus according to claim 6, wherein the change unit further changes the brightness component of the color difference depending on chroma of the pixel of interest.

8. The image processing apparatus according to claim 6, wherein when the distance difference between the one of the chromatic color differences and the one of the achromatic color differences is a preset value or less, the difference of the brightness component between the chromatic color difference and the achromatic color difference is a preset value or less, and the chroma of the selected one of the representative colors is a preset value or less, the change unit changes the brightness component of the color difference.

9. The image processing apparatus according to claim 8, wherein the change unit further changes the brightness component of the color difference depending on chroma of the pixel of interest.

10. The image processing apparatus according to claim 1, wherein the change unit further changes the brightness component of the color difference depending on chroma of the pixel of interest.

11. A non-transitory computer readable medium storing a program causing a computer to execute the functions of the image processing apparatus according to claim 1.

12. An image processing method comprising:
    extracting representative colors from a target image;
    calculating a color difference between each of the representative colors and a pixel of interest of the target image;
    changing a brightness component of the color difference depending on chroma of the representative colors; and
    selecting one of the representative colors depending on the changed color differences to replace a color of the pixel of interest by the selected one of the representative colors.

\* \* \* \* \*